Aug. 18, 1942.                H. RÜHL ET AL                2,293,175
            INDICATING APPARATUS FOR USE WITH MACHINE TOOLS
                    Filed Jan. 5, 1939            9 Sheets-Sheet 1
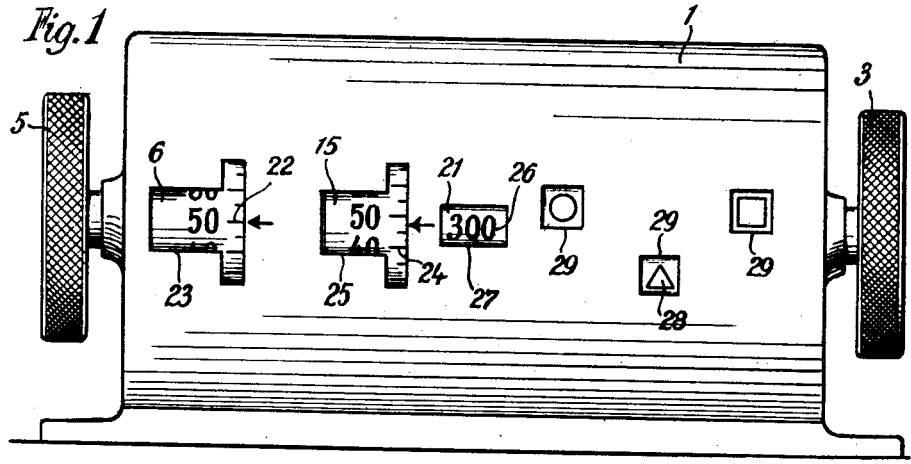
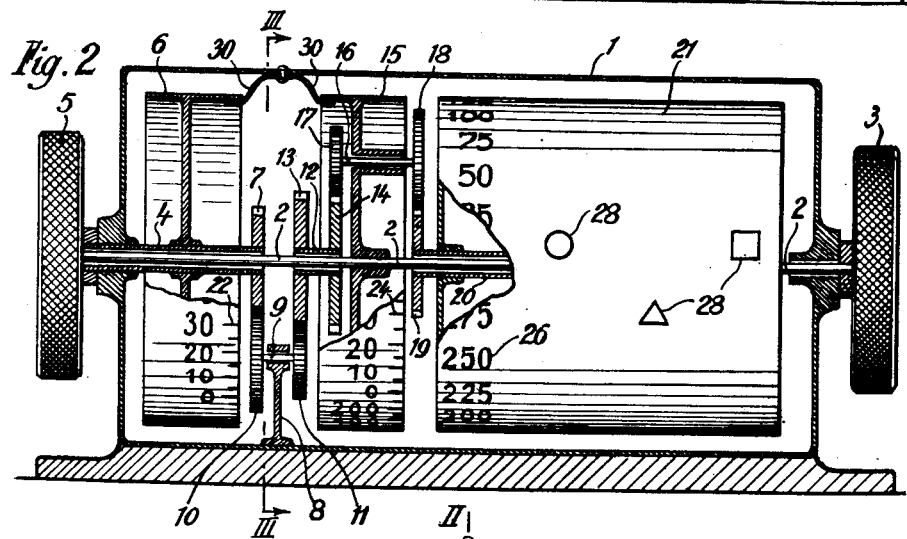
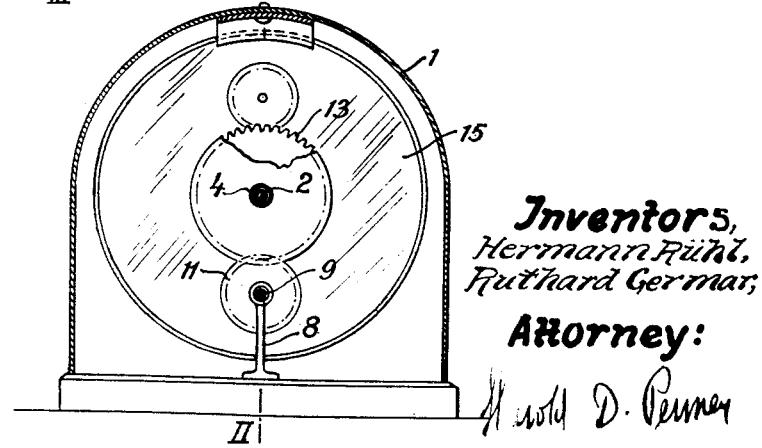
Inventors,
Hermann Rühl,
Ruthard Germar,
Attorney:

Inventors, Hermann Rühl,
Ruthard Germar,
Attorney, Harold D. Penney

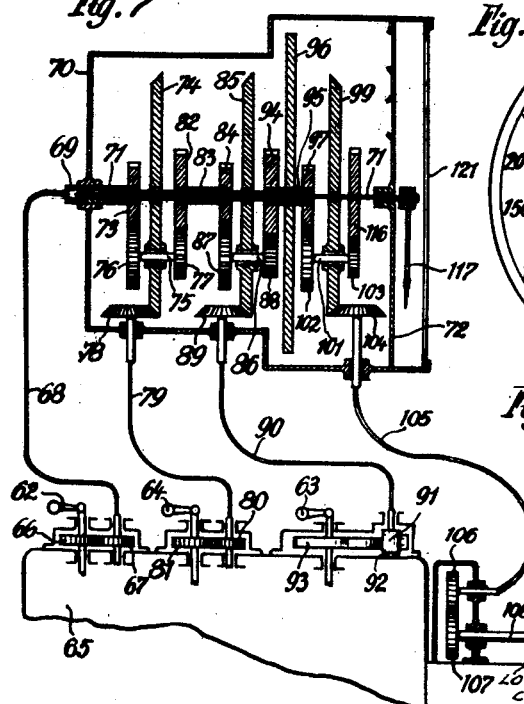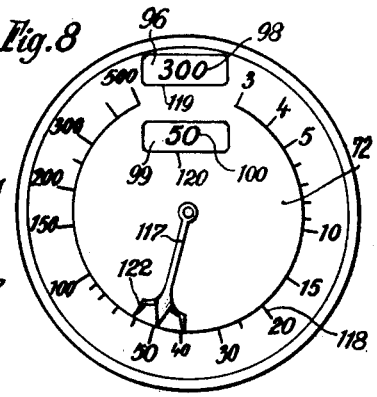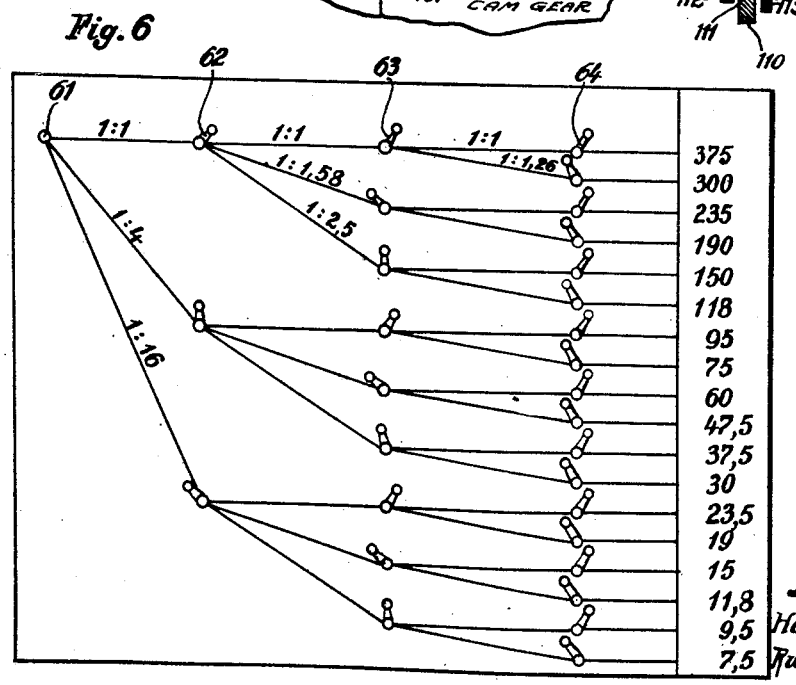

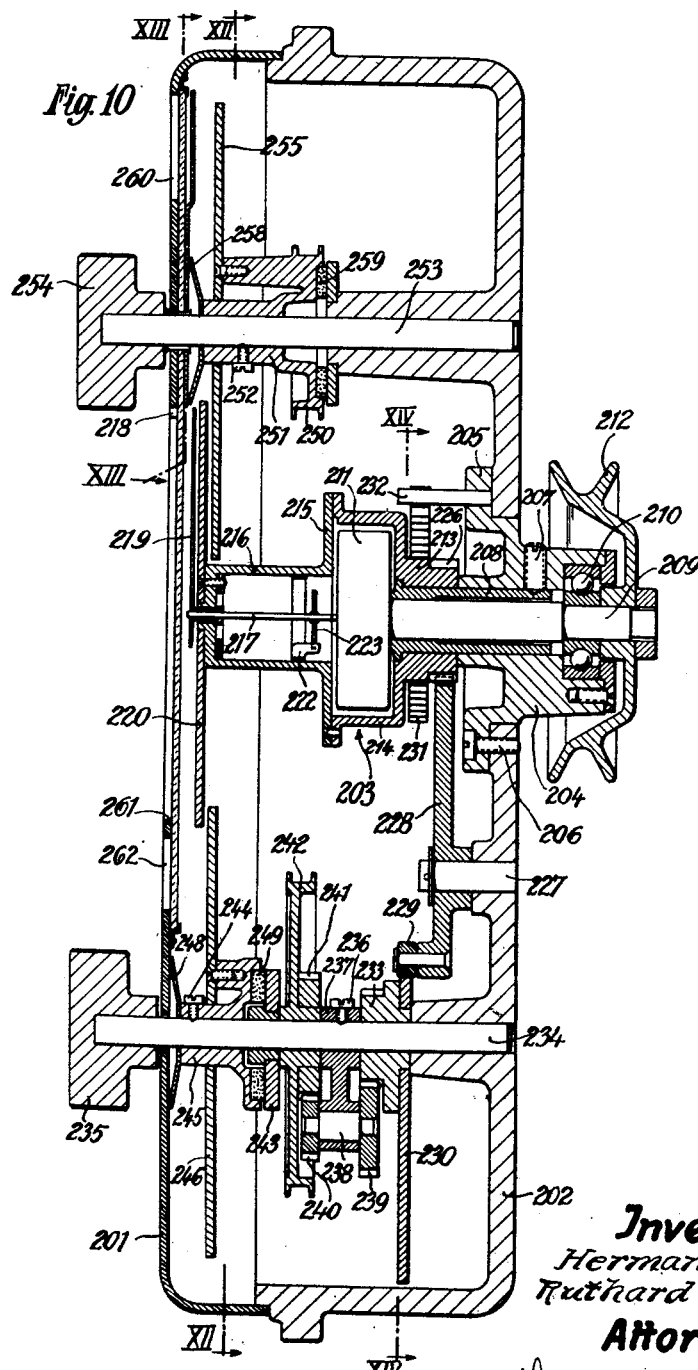

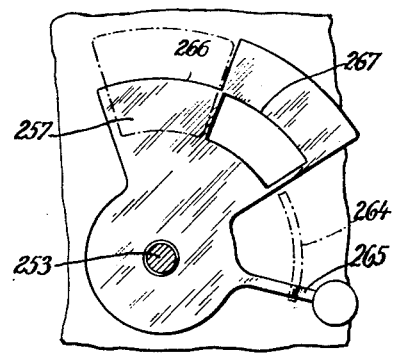
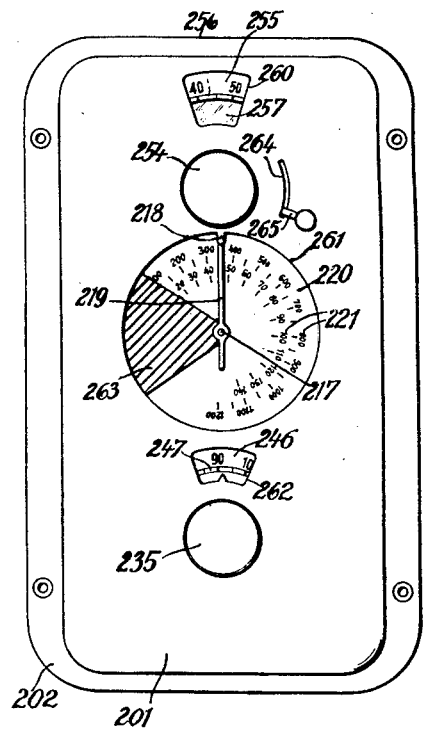
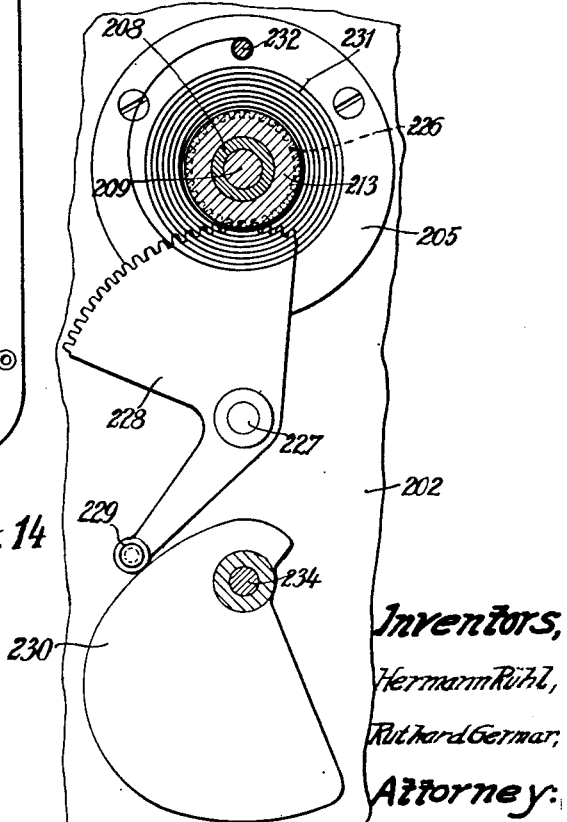

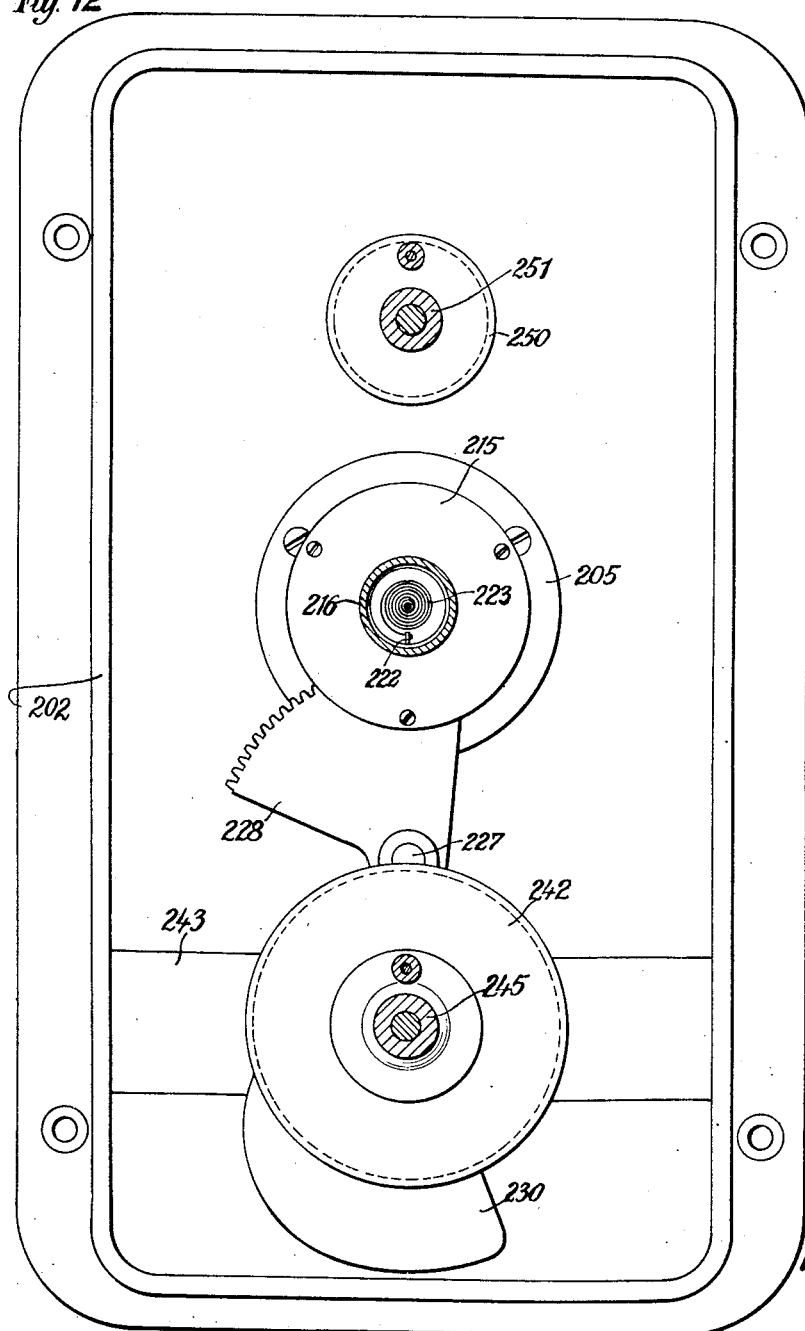

Aug. 18, 1942.   H. RÜHL ET AL   2,293,175
INDICATING APPARATUS FOR USE WITH MACHINE TOOLS
Filed Jan. 5, 1939   9 Sheets-Sheet 7

Inventors, Hermann Rühl,
Ruthard Germar,
Attorney:
Harold D. Penney

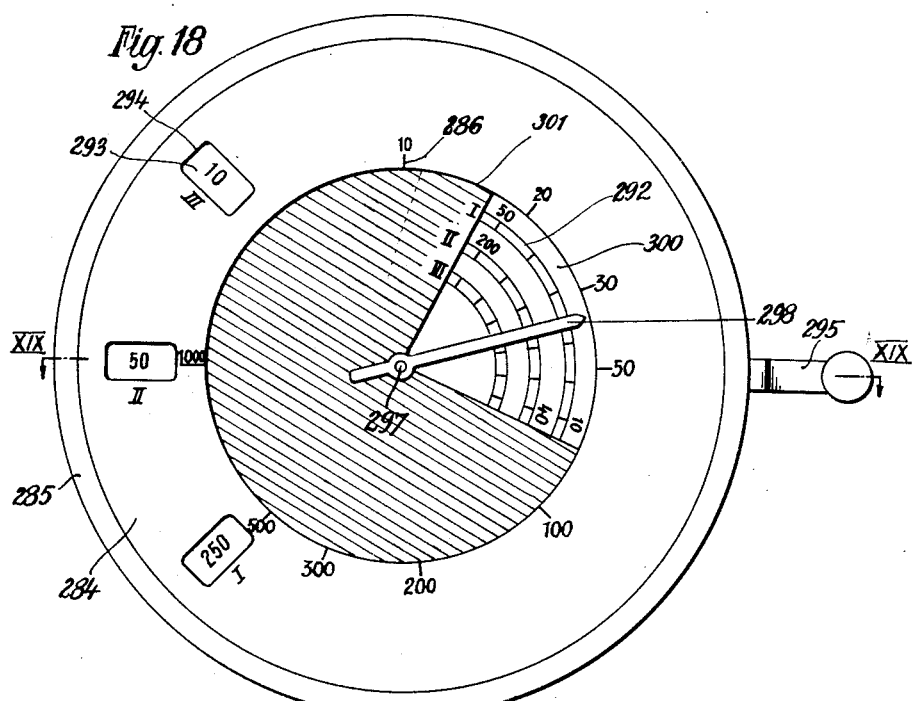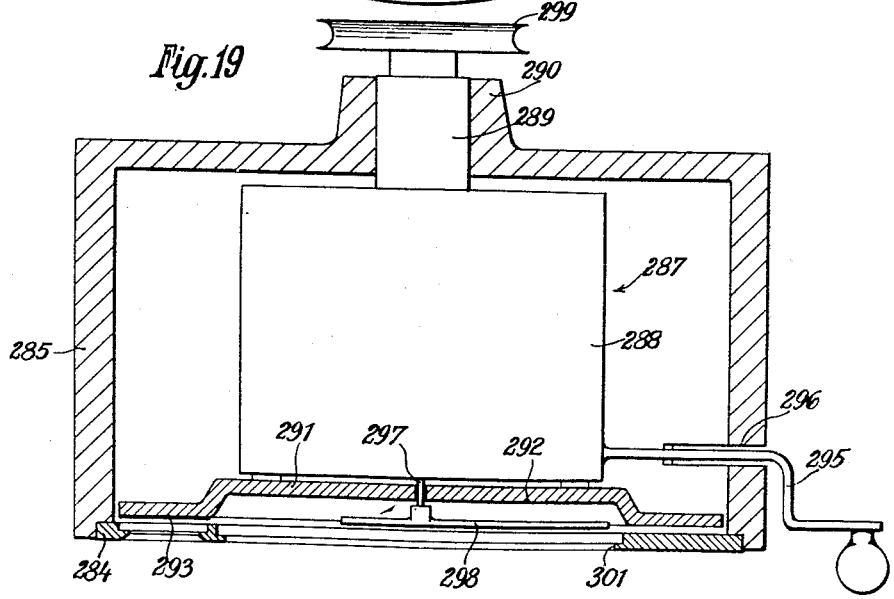

Aug. 18, 1942.  H. RÜHL ET AL  2,293,175
INDICATING APPARATUS FOR USE WITH MACHINE TOOLS
Filed Jan. 5, 1939  9 Sheets-Sheet 9

Inventors, Hermann Rühl,
Ruthard Germar.
Attorney: Harold D. Penney

Patented Aug. 18, 1942

2,293,175

UNITED STATES PATENT OFFICE 2,293,175

INDICATING APPARATUS FOR USE WITH MACHINE TOOLS

Hermann Rühl, Villingen, Schwarzwald, and Ruthard Germar, Goppingen, Wurttemberg, Germany, assignors to Kienzle Taxameter-und Apparate A.-G., Villingen, Schwarzwald, Germany Application January 5, 1939, Serial No. 249,368
In Germany February 7, 1938

34 Claims. (Cl. 82—1)

This invention relates to an apparatus for determining the magnitude of at least one of a number of variable factors in the removal of cuttings by machine tools. The object of the invention is to determine the magnitude desired in the simplest possible manner.

A number of calculating devices are already known for ascertaining the magnitudes of various factors in the removal of cuttings by machine tools, but the determination of the magnitudes required by means of the known calculating devices is a relatively slow and complicated process.

In the apparatus of the invention adjustable indicating members which are associated with the individual factors for example, the speed of rotation, the diameter of the work, or the cutting speed, are coupled together by means of a positive drive and at least part of these indicating members are associated with logarithmic graduations. The above-mentioned positive drive is conveniently in the form of an epicyclic gear. The apparatus according to the invention combines the following advantages which hitherto could not be obtained simultaneously.

By means of the above-mentioned positive drive a positive interdependency of movement between the indicating members is obtained. The indication of any particular value which influences the magnitude which it is desired to ascertain may be read at a fixed place or indicated on a particular scale by means of a pointer. The values which are set up as well as those which are determined can be read off without any approximations. Furthermore any desired range of indication and any desired accuracy may be obtained, and the number of the factors or divisors which determine the wanted magnitude may be as great as desired.

The indicating members may be provided with graduated scales which move behind a stationary pointer, a window or the like, or the indicating members may be in the form of pointers which move over graduated scales. Both the moving and the stationary scales are graduated logarithmically. By means of the epicyclic gears the movements of the indicating members are added or subtracted in a manner which may be regulated gradually. Owing to the logarithmic graduations, a corresponding multiplication or division is carried out and this calculating operation is then capable of being read off. The dependency of the movement of one indicating member upon the movement of another indicating member may be regulated by altering interposed transmission gears.

The speed of rotation, the feed or the like in machine tools is dependent upon the magnitude of other operating factors such as the cutting speed, the diameter, the kind of material, the kind of tool and so forth. In known devices the operating magnitudes, namely the diameter of the work, the cutting speed and the speed of rotation are not indicated in a manner which is immediately apparent and therefore the cutting speed cannot be easily supervised.

By means of the invention on the other hand the advantage is obtained that a machine tool may be set at the desired working speed in an extremely simple and rapid manner and the supervision of the machine is facilitated.

According to a further feature of the invention, the zero position of an indicating member which indicates the magnitude required is displaced by means of gearing in accordance with the setting of indicating members.

Thus by setting desired values, for example, cutting speeds, diameter etc. the position of a member which is dependent for its setting upon the speed, for example, an indicator of the speed of rotation may be so influenced that the correct adjustment of the machine to the necessary speed is indicated by the movement of the said member, of which the position is dependent upon the speed, over an indicating member the position of which is not variable, for example, a scale or a setting mark.

If a member which is dependent upon the speed moves over a graduated scale, a pre-setting of all operating magnitudes, for example, the cross-section of the cuttings and speed of cutting, can be undertaken with the apparatus of the invention, the last operating magnitude, for example the diameter, which determines the necessary speed, for instance the speed of rotation, only being excepted. The indicating member of which the position is dependent upon this speed is thereby displaced and indicates upon a fixed indicating member the value of the last factor for example, the diameter, which corresponds to the speed at the moment. The setting of the machine to the correct speed is thus denoted in this case by the fact that the indicating member which is dependent upon the speed, for example, the pointer of a tachometer, together with a stationary indicating member, for example a scale, gives the correct indication of the magnitude of the factor desired.

In the case of a pointer moving over a setting mark, there may be effected, in accordance also with the invention, a pre-adjustment of all operating magnitudes for example, cutting speed and diameter, which determine the speed, for instance the speed of revolution, whereby the indicating member which is dependent upon the speed to be regulated, for example the pointer of a tachometer, is so moved that, on setting the necessary speed, the pointer indicates a mark fixed on the casing of the apparatus. The setting is in this case denoted by the pointer coinciding with a mark.

A further feature of the invention is that, in accordance with the setting of at least one indicating member, a setting member, for example a mark, may be so adjusted relatively to a second setting member, for example a pointer, the position of which is dependent upon the working speed, that the correct speed of the machine is indicated by the second setting member coinciding with the first setting member.

By means of the apparatus according to the invention all the values which influence the speed may be indicated in a plainly visible manner and the machine may be set easily and rapidly with the aid of this apparatus.

The drawings indicate diagrammatically and by way of example various constructional forms of indicating apparatus according to the invention. In the drawings Figure 1 is a plan of the indicating apparatus according to one form of construction.

Figure 2 is a part longitudinal section through the apparatus illustrated in Figure 1, taken on the line II—II of Fig. 3, Figure 3 is a cross section on the line III—III of Figure 2.

Figure 6 is a diagram illustrating the use of an apparatus of another form of construction for determining the cutting speed.

Figure 7 illustrates the above-mentioned apparatus in longitudinal section.

Figure 8 is an end elevation of the apparatus shown in Figure 7.

Figure 9 illustrates a detail of Figure 7 in plan.

Figure 10 is a vertical central cross-section through a further form of construction of an apparatus according to the invention.

Figure 11 is a front elevation of the apparatus shown in Figure 10 on a smaller scale.

Figure 12 is a vertical section on the line XII—XII of Fig. 10.

Figure 13 illustrates a detail in vertical section on the line XIII—XIII of Figure 10.

Figure 14 is a vertical section on the line XIV—XIV of Figure 10.

Figure 18 is a front elevation of another simplified form of construction of an apparatus according to the invention.

Figure 19 is a horizontal section on the line XIX—XIX of Figure 18.

Figure 4:
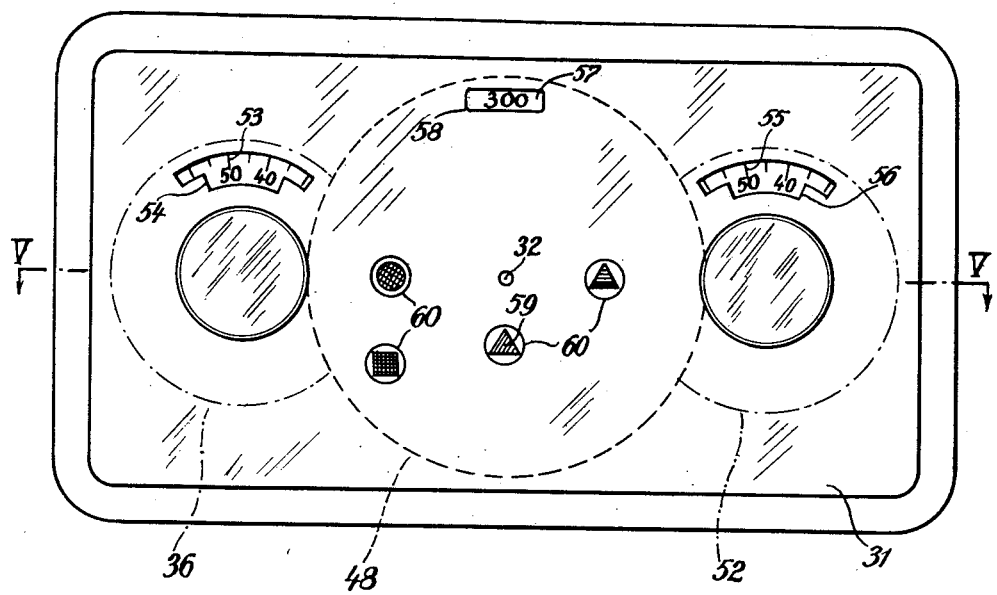
Figure 4 is a plan of the indicating apparatus according to another form of construction.

The apparatus illustrated in Figs. 1 to 3 is intended for the continuous determination of the speed of rotation of machine tools in the case when the cutting speed and the diameter of the work are fixed.

In the casing 1 of the device is a revoluble shaft 2 upon which is attached an adjusting knob 3. On the shaft 2 is a revoluble sleeve 4 upon which are fixed a setting knob 5, a drum 6 and a toothed wheel 7. When the knob 5 is turned the drum 6 and the toothed wheel 7 are accordingly rotated. An intermediate shaft 9 which carries toothed wheels 10 and 11 is revolubly mounted in a bearing 8 which is arranged in the casing 1. The toothed wheel 10 meshes with the toothed wheel 7 while the toothed wheel 11 engages with a toothed wheel 13 which is attached to a sleeve 12. The sleeve 12 is revoluble upon the shaft 2 and a toothed wheel 14 is also provided on this sleeve.

On the shaft 2 is also fixed a drum 15 which serves as carrier for the shaft 16 of an epicyclic gear. The shaft 16 is revoluble in the drum 15 and the planet wheels 17 and 18 are attached to this shaft. The planet wheel 17 meshes with the previously mentioned toothed wheel 14. The planet wheel 18 meshes with a toothed wheel 19 which is fixed to a sleeve 20. The sleeve 20 is revoluble upon the shaft 2. On the sleeve 20 there is also mounted a drum 21.

The drum 15 which serves as carrier for the epicyclic gear is accordingly rigidly connected to the shaft 2 which is revoluble by means of the knob 3 while all the other wheels and drums are free to rotate upon the shaft 2.

Upon the drum 6 are the diameter graduations 22, which may be read in the window 23 (Fig. 1) of the casing 1. On the drum 15 are provided the graduations 24 for the cutting speed which may be read in the window 25, while on the drum 21 are provided the graduations 26 for the speed of rotation, which may be read in the window 27. The graduations 22, 24, 26 are in the form of a logarithmic scale. On the drum 21 there may be also provided symbols 28, numerals, letters or the like which are visible in the windows 29 and indicate the manner in which the operator is to set the operating members (levers or the like) on his machine. For example, three windows 29 may be provided for three operating levers. Each of the various positions of these adjusting levers is associated with a symbol 28, or a numeral or the like. It is also convenient to represent the levers of the machine symbolically on the drum 21 in the angular position which corresponds to the necessary setting of the lever on the machine. If the speed of rotation is fixed, there now appears in the window 29 which is associated with the appropriate lever of the machine tool, the symbol 28 or the numeral at which the corresponding operating lever is to be set.

Inside the casing 1, there is also riveted to the casing wall a two armed leaf spring 30 (Fig. 2). The arms of this leaf spring bear against the internal peripheral surfaces of the drums 6 and 15 and act as brakes in order to make it harder to rotate the drums 6, 15, relatively to the drum 21. Instead of the aforesaid resilient friction braking device, other arresting devices which act in a similar manner may be provided. For example, the rims of the drums 6, 15 may be provided internally on the edges which face one another, with fine toothing, in which engage spring-actuated pawls, which are arranged on the casing 1 in similar manner to the leaf spring 30 (Fig. 2).

The method of operation of the device illustrated in Figs. 1 to 3 is as follows:

By means of the knob 5, the drum 6 is set to a given diameter. Through the agency of the toothed wheels 7, 10, 11, 13, 14, 17, 18 the toothed wheel 19 and therefore the speed drum 21 is thereby turned. No rotation of the cutting speed drum 15 can take place because the rotation of this drum is prevented by the brake 30. The rotation of the diameter drum 6 is effected against the friction of the brake 30.

The transmission ratio of the gear train which comes into operation in the case described from the toothed wheel 7 to the toothed wheel 19 is, in the form of construction illustrated, such that a rotation of the drum 6 corresponds to an equal rotation of the drum 21 in the same direction. The graduations 22 for the diameter are in this case spaced apart by the same distance as the graduations 26 for the speed of rotation. The diameter is thus accurately set at the given value. The exact setting of this value is facilitated by the provision of the graduations 22.

By means of the knob 3 the drum 15, which carries the graduations 24 for the cutting speed, is so rotated that the desired cutting speed value is also accurately set. The cutting speed drum 15 is thereby rotated against the friction of the brake 30, while the diameter drum 6 is arrested by the above-mentioned brake. Accordingly, rotation not only of the toothed wheel 7 but also of the toothed wheels 10, 11, 13 and 14 is prevented. Upon the rotation of the drum 15 the epicyclic gear 16, 17, 18 is turned. Since the toothed wheel 14 is arrested in this case, the toothed wheel 18 of the epicyclic gear acts upon the toothed wheel 19 which is rigidly connected to the speed drum 21 in such a manner that a rotation of the drum 21 is caused which is equal in amount to the rotation of the drum 15 but is in the opposite direction. The graduations 24 for the cutting speed are the same distance apart as the graduations 26 for the speed of rotation.

If, when the given diameter and the given cutting speed have been set up, none of the speeds of rotation, to which the machine, which perhaps can be set only to certain fixed speeds, can be set, appears in the window 27 for the rate of rotation, the cutting speed knob 3 can be rotated until the next higher or the next lower speed is properly set up. The greater or smaller cutting speed which is associated with this rate of rotation at the given diameter may then be read off with perfect accuracy and it can be judged without any error in reading whether it is more convenient to choose the higher speed of rotation or the lower speed of rotation.

The device can also be operated inversely, so that for example if a definite speed of revolution is given and the diameters of the various pieces of work vary, the correct cutting speed is indicated.

The transmission ratios of the gears which have been described above are as follows:

$$\frac{\text{Wheel } 7}{\text{Wheel } 10} = 1:1 \quad \frac{\text{wheel } 11}{\text{wheel } 13} = 1:2 \quad \frac{\text{wheel } 14}{\text{wheel } 17} = 2:1 \quad \frac{\text{wheel } 18}{\text{wheel } 19} = 1:1$$

The transmission ratio from the one driving wheel 19 to the other driving wheel 14 of the epicyclic gear by way of the planet wheels 17 and 18 amounts therefore to 1:2. Therefore the transmission between the drum 15 and the one driving wheel $19 = -1$. When the epicyclic gear is constructed in this manner equal logarithmic divisions may therefore be provided on the drums 15 and 21.

In order that the same logarithmic divisions may also be used for the third indicating member 6, the transmission from the wheels 13 and 14, which are coupled together, to the wheel 7 through the wheels 11 and 10 is in the ratio of 2:1. When the transmission ratios are so dimensioned it is possible to use the same logarithmic divisions for all the indicating drums 6, 15 and 21 which is extremely advantageous both for manufacture and for operation.

If the transmission ratio of the gear 9, 10, 11, is altered the graduation on the indicating drum 6 will be different.

Figure 5:
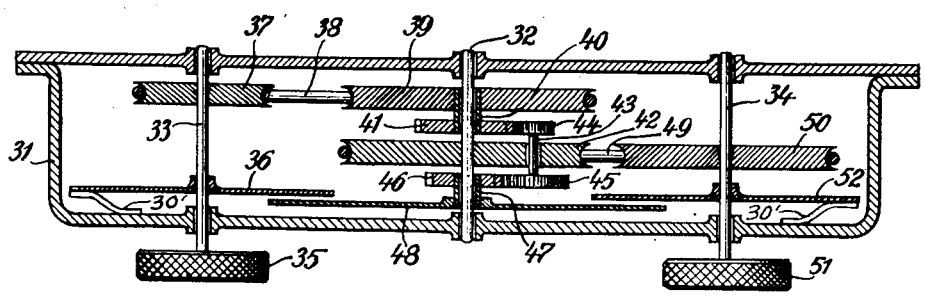
Figure 5 is a section on the line V—V of Figure 4.

The indicating device which is illustrated in Figures 4 and 5 is provided with disc-shaped indicating members so that, owing to its flat form, the device may be very easily and conveniently fitted on a machine tool or the like.

In a casing 31 are revolubly mounted a central shaft 32 and two lateral shafts 33 and 34. To the shaft 33 are attached a setting knob 35, an indicating disc 36 and a rope pulley 37.

The rope pulley 37 is in driving connection, by means of a rope 38, with a rope pulley 39 which is of larger diameter. The pulley 39 is attached to a sleeve 40 which is revoluble on the central shaft 32 and on which is also mounted a toothed wheel 41. On the shaft 32 is fixed a rope pulley 42 which acts as the carrier for the shaft 43 of an epicyclic gear. The shaft 43 is revoluble in the pulley 42. On this shaft 43 are fixed toothed wheels 44 and 45 of which the toothed wheel 44 meshes with the toothed wheel 41 previously mentioned. The toothed wheel 45 is in engagement with a toothed wheel 46 which is mounted on a second sleeve 47 which is revoluble on the shaft 32. To the sleeve 47 is also fixed an indicating disc 48.

The rope pulley 42 which acts as carrier for the epicyclic gear 43, 44, 45 is in driving connection with a rope pulley 50 of equal size by means of a rope 49. The pulley 50 is fixed to the shaft 34. On this shaft are also mounted a setting knob 51 and an indicating disc 52.

The disc 36 carries the diameter graduations 53 which are visible in an aperture 54 of the casing 31. The disc 52 carries the cutting speed graduations 55 which are visible in an aperture 56. The disc 48 carries the speed of rotation graduations 57 which may be read off in an aperture 58. Furthermore, there may be provided on the disc 48 which indicates the speed of rotation characteristic symbols 59, numerals, letters or the like which correspond to the prescribed lever position and which appear in apertures 60.

The method of operation of the device illustrated in Figures 4 and 5 is substantially the same as that of the apparatus illustrated in Figures 1 to 3. When the knob 35 is set there is not only the diameter disc 36 rotated, but through the intermediary of the pulley 37, the rope 38, the pulley 39 and the toothed wheel 41, the toothed wheel 44 of the epicyclic gear is also driven. On the other hand upon setting of the knob 51 not only is the disc 52 for the cutting speed rotated but, through the intermediary of the pulley 50 and the rope 49, the pulley 42 which carries the epicyclic gear 43, 44, 45 is also driven. The position of the disc 48 for indicating the speed of rotation is therefore determined both by the position of the diameter disc 36 and by the position of the cutting speed disc 52. The transmission ratio which is obtained by the interpolation of the countershaft, pinions 10, 11 in Figure 2, is obtained in the apparatus of Fig. 5 owing to the different diameters of the discs 37, 39. The discs 36, 52 (Fig. 5) are acted upon by a braking device 30' similar to the braking device 30 shown in Figure 2.

The apparatus illustrated in Figs. 7 to 9 may be used for the automatic and accurate determination of the cutting speed and also for measuring the rate of rotation and the diameter of the work in the operation of a machine tool.

Measuring the speed of rotation of a machine tool offers relatively great difficulties because the range of regulation of machine tools amounts to 5 to 10 times the range of indication of ordinary tachometers.

To enable the apparatus shown in Figs. 7 to 9 to be understood the regulation of the speed of rotation or the building up of the speed of rotation in machine tools will first be described. This regulation can be utilised in order to obtain a simple and accurate indication of the speed of rotation with the use of the apparatus according to the invention provided with epicyclic gear.

The regulation of the rate of rotation of a machine tool which has for example three driving levers and works with 18 speeds is diagrammatically illustrated in Figure 6.

The speed of rotation of the driving shaft 61 (Fig. 6) may be transmitted by means of a countershaft which is adjusted by a lever 62 in the ratio 1:1, 1:4, or 1:16. The speeds thus obtained may be transmitted into the ratio 1:1, 1:1.6 and 1:2.5 by means of gearing which may be set by a lever 63. In this manner nine different speeds can be attained. Each of these speeds may be transmitted by further gearing which is adjusted by a lever 64 in the ratio 1:1 and 1:1.26 so that in all eighteen different speeds may be obtained at intervals of 1:1.26.

The apparatus illustrated in Figures 7 to 9 is so acted upon by the levers 62 to 64 (compare Figure 6) arranged on the frame 65 of a machine tool, for example a lathe, that this device indicates the speed of the machine.

A toothed wheel 66 which is connected to the lever 62 on the first countershaft meshes with a toothed wheel 67 which is connected to a flexible shaft 68. The flexible shaft 68 is connected to a sleeve 69 which is revoluble in the casing 70 of the indicating apparatus and projects into this casing. Inside the sleeve 69 is revolubly mounted the left end of a shaft 71 which in the vicinity of its right end is revoluble in a disc 72, fixed to the casing 70. On the sleeve 69 is fixed a toothed wheel 73; by setting the lever 62 the toothed wheel 73 is therefore rotated.

On the shaft 71 is revoluble a bevel wheel 74 in which is revoluble the shaft 75 of an epicyclic gear. Two planet wheels 76, 77 are fixed to the shaft 75. The bevel wheel 74 which acts as carrier for the epicyclic gear 75, 76, and 77 meshes with a bevel wheel 78 which is connected by means of a flexible shaft 79 to a toothed wheel 80 which is revoluble on the machine frame 65. With this toothed wheel 80 engages a toothed wheel 81 which is connected to the lever 64. If therefore the lever 64 is adjusted the bevel wheel 74 is correspondingly rotated.

The toothed wheel 76 of the epicyclic gear 75, 76, 77, which is carried by the bevel wheel 74 meshes with the toothed wheel 73 previously described. The toothed wheel 77 of the epicyclic gear meshes with a toothed wheel 82 which is fixed to a sleeve 83 which is revoluble on the shaft 71. On the sleeve 83 is also mounted a toothed wheel 84. On the shaft 71 a second bevel wheel 85 is revoluble. In this bevel wheel is revolubly mounted the shaft 86 of another epicyclic gear which carries the two planet wheels 87, 88. The bevel wheel 85 which acts as the carrier for the epicyclic gear 86, 87, 88 meshes with a bevel wheel 89 which is connected by means of a flexible shaft 90 to a lever 91 (Fig. 9) which is revoluble on the machine frame 65. The lever 91 is swung by a cam 93 against the action of a spring 92 which is connected to the machine frame. The cam 93 is connected to the above-mentioned lever 63. By setting the lever 63 the bevel wheel 85 is therefore correspondingly rotated. Since, by rotating the lever 63 from the one end position into the other end position, an increase or decrease of the transmission ratio is not effected in uniform steps, but the transmission ratio is greatest when the lever 63 is in the central position, the cam 93 is so shaped that it swings the lever 91 farthest outwards when the lever 63 is in the central position. The part $r_2$ of the cam 93 which extends farthest from the centre is therefore located between the part $r_1$ which is at the smallest distance from the centre and the part $r_3$ which is at a somewhat greater distance from the centre. The amount by which the lever 91 is pivoted, accordingly corresponds to the transmission ratio which is engaged by means of the lever 63.

The planet wheel 87 of the epicyclic gear 86, 87, 88 meshes with the toothed wheel 84. The planet wheel 88 meshes with a toothed wheel 94 which is mounted on a sleeve 95 which is revoluble on the shaft 71. On the sleeve 95 are also fixed a disc 96 and a toothed wheel 97. The disc 96 is provided with the graduations 98 for the speed of rotation (Fig. 8). The disc 96 is set against the action of a braking member which is not illustrated and which is similar to the braking member 30 shown in Figure 2.

On the shaft 71 is revolubly mounted a bevel wheel 99 which is provided with the graduations 100 for the diameter (Fig. 8). The bevel wheel 99 is also set against the action of a braking member which is similar to the braking member 30 shown in Fig. 2. In the bevel wheel 99 is revoluble the shaft 101 of a further epicyclic gear. On the shaft 101 are mounted the planet wheels 102, 103. The bevel wheel 99 which serves as carrier for the epicyclic gear 101, 102, 103, meshes with a bevel wheel 104. The bevel wheel 104 could be rotated directly by means of a setting knob arranged outside the casing 70, so that by means of this setting knob the position of the bevel wheel 99 which is provided with the diameter graduations 100 would also be fixed.

In the constructional embodiment illustrated, however, the bevel wheels 99, 104 are set in accordance with the setting of the tool holder of the machine. The bevel wheel 104 is for this purpose connected by means of a flexible shaft 105 to a toothed wheel 106 which is revoluble on the machine frame. The toothed wheel 106 meshes with the toothed wheel 107 which is attached to the left-hand end of a shaft 108 (Fig. 7). The shaft 108 is connected at the right end through the intermediary of the logarithmic cam gear 124 to the left end of a shaft 125. By means of the cam gear 124 a linear alteration in diameter is converted into a movement which follows a logarithmic law. A toothed wheel 109 is mounted on the shaft 125 in the vicinity of its right-hand end. On the right hand end of the shaft 125 is a revoluble setting disc 110 which is braked by springs 123. The disc 110 acts as carrier for an epicyclic gear 111, 112, 113, of which the shaft 111 is revoluble in the disc 110. The planet wheel 112 meshes with the toothed wheel 109, the planet wheel 113 meshes with the toothed wheel 114 which is fixed to a shaft 115. The shaft 115 is rotated by the radial setting of the tool holder, (which is not illustrated), of the machine. Through the intermediary of the gear which has been described above, the rotation of the shaft 115, which corresponds to the radial movement of the tool holder, is transmitted to the bevel wheel 99 which is provided with the diameter graduations 100.

Since, however, the position of the point of the tool relatively to the tool holder is not fixed, a certain position of the tool holder is not invariably associated with a corresponding diameter of the work. In view of this the disc 110, which carries the epicyclic gear 111, 112, 113, is provided. This disc is set at a value corresponding to the clamping of the tool in the tool holder. The adjustment necessary for the different positions of the tool in the holder may thus be effected by adjusting the disc 110.

As has been described above the bevel wheel 99 which is provided with the diameter graduations 100 carries the epicyclic gear 101, 102, 103. The planet wheel 102 meshes with the toothed wheel 97, which has already been referred to above. The planet wheel 103 meshes with the toothed wheel 116 which is fixed to the shaft 71. On the shaft 71 there is also fitted a pointer 117, with which is associated on the disc 72 the scale 118 (Fig. 8) for the cutting speed. The pointer 117 therefore indicates the cutting speed. The disc 72 is provided with windows 119, 120, through which the graduations 98 for the speed of revolution and the graduations 100 for the diameter may be seen. The pointer 117 is covered on the outside by a glass disc 121.

On the pointer 117 are provided two small lateral pointers 122 (Fig. 8). These small pointers are at such a lateral distance from the apex of the main pointer that they indicate the cutting speed which is obtained on increasing or reducing the speed of revolution by the amount corresponding to one step of the change gear speed. By means of the pointers 122 the operator may easily see whether it is advisable to increase or reduce the speed of revolution.

The method of operation of the indicating apparatus shown in Figures 7 to 9 is similar to that of the form of construction which has been previously described above. There is, however, a difference in that, in the forms of construction according to Figures 1 to 3, and Figures 4 to 5, the working diameter and the cutting speed are set up in order to determine the speed of revolution, whereas in the form of construction according to Figs. 7–9, the speed of revolution and the working diameter are set up in order to determine the cutting speed. Further, in the apparatus illustrated in Figs. 1–3 and in Figs. 4 and 5, the setting drums, for example the diameter drum 6 and the cutting speed drum 15 of Fig. 2 are set by means of knobs, for instance by the knobs 5 and 3 shown in Figure 2. The operator must, therefore, set a number of levers or the like of the machine. In the apparatus according to Figures 7 to 9 on the other hand, the setting of the disc 96 for the speed of revolution is effected by operating the levers 62, 63, 64, which are associated with the countershafts of the machine, i. e. there is no particular knob provided for setting the disc 96 for the speed of revolution. The danger of the operator making a mistake in the operation of the machine is therefore reduced.

The diameter wheel 99 as described above is also set directly by radial displacement of the tool carrier through the agency of the shaft 115 and the gearing which is interposed between that shaft and the wheel 99, is merely necessary, as described above, in case of need to set the disc 110 at the value corresponding to the position of the tool relatively to the tool carrier.

The method of operating the drive of the apparatus illustrated in Figures 7 to 9 is substantially the same as the method of operation of the drives illustrated in Figs. 1–3 and Figs. 4 and 5. In the apparatus shown in Figs. 6 and 7, however, the number of epicyclic gears is increased in view of the fact that the speed disc 96 is not influenced by a single setting member, for example an adjusting knob as in the constructions previously described, but by the three levers 62, 63 and 64 associated with the several countershafts of the machine. The transmission ratios of the toothed wheels, which are interpolated in the various sections of the drive leading from the levers 62, 63, 64 to the speed disc 96, are such that the position of the disc 96 always corresponds to the speed of revolution to which the machine is set by means of the gearing. In the constructional form illustrated a displacement of the lever 62 by one step causes, for example, a rotation of the disc 96 by six units, a displacement of the lever 63 causes a rotation of the disc 96 by two units and a displacement of the lever 64 a rotation of the disc 96 by one unit. By means of the planet wheels 76, 77 and 87, 88 the disc 96 is always set at the mean value corresponding to the various positions of the levers 62, 63, 64.

In the same manner the transmission ratio of the toothed wheels which are interpolated between the tool carrier, or the shaft 115 acted upon thereby, and the wheel 99 is such that the correct diameter is always indicated.

The planet wheels 102, 103, provided in the apparatus illustrated in Figs. 7 to 9 therefore effect, in the same way as the planet wheels in the apparatus illustrated in Figures 1 to 3 and Figures 4 and 5, the automatic setting of the value required, and thus, in the apparatus illustrated in Figures 7 to 9, the indication of the cutting speed required by means of the pointer 117, that is to say, the disc 96 for the speed of revolution and the wheel 99 for the diameter act upon the pointer, through the agency of the planet wheels 102, 103, in such a manner that the latter indicates the required cutting speed which represents a function of the diameter and the speed of revolution.

Since, in the apparatus of Figures 7 to 9, the speed of revolution is positively set on the disc 96 and the diameter is positively set on the wheel 99 and since, furthermore, the cutting speed is indicated by means of the pointer 117, all three working factors are plainly visible on the scale or in the windows of the indicating disc 72 (Fig. 8).

The apparatus illustrated in Figures 7 to 9 is principally intended for a lathe having a number of speeds which can be changed in steps. The apparatus according to the invention may however also be used for machines in which a gradual regulation of speed is possible. In this case it is only necessary to associate with a particular position of the operating member used for setting the appropriate gear of the machine, a certain transmission ratio of this drive within the necessary limits of accuracy.

Furthermore, in the apparatus according to the invention epicyclic gears and intermediate gearing may be employed in order to obtain any desired transmission ratio between the factors and divisors or epicyclic gears may be used without intermediate gearing in which case a transmission ratio which is produced by means of the epicyclic gear and which differs from 1:1 may be taken into consideration in graduating the indicating scale or in the construction of the controlling device for the machine.

In the apparatus illustrated in the Figures 10 to 14, the mechanism described below is enclosed in a flat casing 202 which is closed by means of a lid 201 (Fig. 10). In the middle of the casing 202 is fitted a speedometer 203 which is constructed in known manner on the eddy current principle. The speedometer 203 is provided with a casing 204 of which the flange 205 is attached to the casing 202 by means of screws 206. In the casing 204 a sleeve 208 is secured by means of a grub screw 207. The driving shaft 209 of the speedometer extends through the sleeve 204 and through the bush 208. This shaft is journalled at the front directly in the bush 208 and at the rear in a ball bearing 210 of the sleeve 208. The front end of the shaft 209 is connected to the box-like driving part 211 of the speedometer 203. On the rear end of the shaft 209 is fastened a pulley 212 which is driven from a shaft of the machine tool by means of a cord which is not shown, and which, through the agency of the shaft 209, causes the box-like part 211 of the speedometer to rotate.

On the bush 208 is revoluble the boss 213 of a casing 214 which surrounds the box-like part 211 with a certain amount of clearance. On the front side of the casing 214 is fixed the flange 215 of a sleeve 216. Through the sleeve 216 extends a spindle 217 which is revolubly mounted at the front disc-like end of the sleeve 216 and projects from this end of the sleeve. At the rear end the spindle 217 is connected to the driven member, which is not illustrated, of the speedometer 203. This driven member is arranged in known manner inside the part 211, and is angularly displaced to a greater or lesser amount relatively to the casing 214 in accordance with the speed of revolution of the part 211.

To the front end of the spindle 217 is attached a pointer 219 which moves behind a mark 218 provided on the cover 201 of the main casing 202 and in front of an indicating disc or dial 220 which is provided on the sleeve 216. On the indicating disc 220 are provided lineal graduations or scales 221 (Fig. 11) for the speed of the revolution. The speed of revolution of the machine tool is thus indicated by the pointer 219 on the scales 221. In the socket 216 is attached an angle piece 222 to which is connected one end of a spiral spring 223. The other end of the spiral spring 223 is attached to the spindle 217. The spiral spring 223 takes up the torque which is exerted upon the spindle 217 by the part 211 whereby the pointer 219 is displaced. When this torque disappears the spiral spring 223 acting through the spindle 217 returns the pointer 219 into the zero position.

The boss 213 of the above-mentioned casing 214 is provided with a toothed ring 226 in which engages a toothed sector 228 which is pivotable about a pivot 227 on the casing 202. The toothed sector 228 carries a roller 229 (Fig. 14) which co-acts with a logarithmic cam 230. On the boss 213 is arranged a spiral spring 231 which is connected at one end to the boss 213 and at the other end to a pin 232 which is provided on the flange 205 (Fig. 10). The spiral spring 231 tends to rotate the boss 213 so that the roller 229 of the toothed sector 228 is pressed against the cam 230.

The logarithmic cam 230 is fixed to a toothed wheel 233 which is revoluble on a shaft 234 which rotates at one end in the casing 202 and at the other end in the cover 201. A setting knob 235 is fixed to the part of the shaft 234 which projects from the cover 201. On the shaft 234 there is also fixed by means of a screw 236 the carrier 237 of an epicyclic gear. In this carrier 237 is revoluble a shaft 238 to which are attached planet wheels 239 and 240. The planet wheel 239 meshes with the previously mentioned toothed wheel 233. The planet wheel 240 meshes with a toothed wheel 241 which is fixed to a pulley 242 which is revoluble on the shaft 234. The shaft 234 is also revolubly mounted in a carrier 243 which is provided on the casing 202.

In the vicinity of the front end of the shaft 234 is fixed by means of a screw 244 a sleeve 245 on which is provided an indicating disc 246. A logarithmic scale 247 (Fig. 11) for the diameter is provided on this indicating disc. By means of a leaf spring 248 (Fig. 10) a friction ring 249 which is fixed to the sleeve 245 is pressed against the carrier 243 so that a certain frictional resistance is opposed to the rotation of the shaft.

The pulley 242 is connected with a pulley 250 by means of a cord which is not illustrated. The boss 251 of the pulley 250 is attached by means of a screw 252 to a shaft 253. The shaft 253 is revoluble at one end in the casing 202 and at the other end in the cover 201. A knob 254 is attached to the part of the shaft 253 which projects from the cover 201. On the boss 251 is provided a disc 255 upon which are provided two logarithmic scales 256 for the cutting speed. One of the scales 256 is illustrated in Fig. 11, while the other scale is concealed, when the parts are in the position shown in Fig. 11, by a screen 257. A friction ring 259 which is fixed to the pulley 250 is pressed by means of a leaf spring 258 against a counterring which is attached to the casing 202. The shaft 253 can therefore be rotated only after a certain resistance has been overcome. As may be seen from Figures 10 and 11 the shafts 234, 209 and 253 are arranged parallel to one another. The spindle 217 is arranged coaxially with the shaft 204.

The cover 201 is provided with windows 260, 261, 262. A part of the indicating disc 255 which is provided with the cutting speed graduations 256 is visible through the window 260. The indicating disc 220 is visible through the window 261. On the indicating disc 220 the range of speeds of revolution which are not to be set is omitted or indicated by a hatched or shaded sector 263. A part of the indicating disc 246 provided with the graduations 247 for the diameter is visible through the window 262.

The screen 257 (Figs. 11 and 13) is of segmental shape and is adjustable on the shaft 253 by means of a hand lever 265 which projects through a curved slot 264 in the cover 201. In the position illustrated in Figures 11 and 13 in which the machine tool works without a countershaft, the angular cut out portion 266 of the screen 257 exposes the upper cutting speed scale 256 while the lower cutting speed scale is concealed. When the machine tool is to work with a countershaft the hand lever 265 is turned in a counterclockwise direction, as viewed in Figures 11 and 13. The screen 257 is thereby moved so that a cut-out portion 267 of the screen 257 exposes the lower cutting speed scale while the upper cutting speed scale is concealed.

The method of operation of the apparatus described is as follows:

When the machine is stationary the pointer 219 (Fig. 11) is in the zero position. It will now be assumed that the operator wishes to set a certain cutting speed. In this case the operator turns the indicating disc 255 into the desired position by means of the knob 254. During the rotation of the knob 254 associated with the uppermost shaft 253, the lowermost shaft 234 is held by means of the brake 248, 249. Upon the rotation of the knob 254 the logarithmic cam 230 is therefore rotated through the agency of the shaft 253, the pulley 250, the cord which is not illustrated, the pulley 242 and the toothed wheels 241, 240, 239, 233. As a result of this the toothed sector 228 is pivoted, and thus the casing 214 of the speedometer 203 is rotated through the agency of the teeth 226. Accordingly the indicating disc 220 and the pointer 219 are also turned, but this pointer still remains in the zero position.

The speedometer, which is used for example, has as mentioned above, a linear scale for the speed of revolution. The actual calculation is, however, carried out by the uniform displacement of logarithmic graduations. It is thus necessary to make the cam 230 of such a shape that the inclination of this cam conforms to the logarithmic law. The transmission ratio between the shaft 253 and the indicating disc 220 is therefore such, taking into consideration the logarithmic graduations provided on the indicating disc 255 and the speed graduations on the indicating disc 220 that, when the diameter remains constant, an increase in the cutting speed results in an appropriate increase of the speed of revolution indicated by the disc 220. The necessary speed of revolution is indicated by the fixed mark 218.

If on the other hand the cutting speed remains constant and a certain adjustment is made, by means of the knob 235, of the diameter indicated on the disc 246, and shown in the window 262, then owing to the action of the brake 258, 259, the shaft 253, the pulleys 250, 242 and the toothed wheel 241 remain at rest, while the carrier 237 which is connected to the shaft 234 is rotated. By means of the wheels 240, 239, of the epicyclic gear of which the wheel 240 now rolls upon the stationary wheel 241, the toothed wheel 233 is again rotated and, through the agency of the cam 230 and the toothed sector 228, the casing 214 of the speedometer is rotated. The transmission ratio is again such that, if the cutting speed remains constant, an appropriate rotation of the disc 220 indicating the speed of revolution is effected by an adjustment of the diameter in the window 262. The correct speed of revolution necessary is again set under the mark 218.

When the machine tool is in operation, the pointer 219 of the speedometer 203 is moved out of the zero position in a clockwise direction (Fig. 11) against the action of the spiral spring 223 by means of the eddy currents which are produced in known manner inside the box-part 211 (Fig. 10). Owing to the rotation effected simultaneously with the casing 214 of the end of the spiral spring 223 which is connected to the angle piece 222, the result is obtained, that independently of the rotation of the casing 214 and the indicating disc 220 connected thereto, the pointer 219 always indicates on the appropriate scale 221 for the speed of revolution on the disc 220 the speed at which the machine tool is being operated, and thus the speed at which the speedometer 203 is driven.

In the manner explained above by setting the cutting speed disc 255 by means of the knob 254 and the diameter disc 246 by means of the knob 235, the disc 220 for the speed of revolution is so set that the mark 218 indicates the prescribed speed of revolution for example 45 revolutions per minutes (see Fig. 11). The correct speed of revolution of the machine tool is then reached when the pointer 219 of the speedometer also indicates the prescribed speed, for example 45 R. P. M. This condition, in accordance with the described setting of the indicating disc 220 by means of the knobs 235, 254, is indicated in a very simple manner in that the pointer 219 of the speedometer indicates the setting mark 218. The numerical value of the speed of revolutions given on the disc 220 is therefore of no importance for the setting and the graduations 221 could therefore be omitted from the disc 220.

It is assumed that in the constructional form illustrated the speedometer 203 is not driven from the working spindle of the machine tool itself, but from a shaft which may be regulated for any speed in the speed ratio of 1:8, which shaft drives the said working spindle either directly or through a reduction gear of 8:1. Accordingly two scales 221 for the speed of revolution are provided on the indicating disc 220. These scales apply respectively to the direct drive of the machine tool and for the drive of the machine tool when the countershaft is engaged.

If the diameter remains constant the cutting speed may also vary in the ratio 8:1. There are accordingly also provided on the indicating disc 255 as described above two scales 256 for the cutting speed. By means of the lever 265 the above-described screen 257 (Fig. 13) is so set that that cutting speed scale 256 is visible in the window 260 which is appropriate for the direct drive or for the drive with the countershaft engaged.

As has been mentioned above, the range of speeds which are to be set are indicated on the indicating disc 220 by means of a hatched sector 263 for example. If upon setting certain cutting speeds and diameters, the hatched sector 263 comes opposite the setting mark 218 this is a signal that the machine tool cannot be set at the corresponding speed or can be set only by means of a particular choice of the gear train transmission.

In an apparatus of the kind described above, it is immaterial what type of speedometer is used. Thus, for particular purposes, it may be advantageous to use a remote controlled speedometer, for example, of an electrical type. In this case the indicating instrument may be fitted in simple manner on the displaceable saddle or rest of the machine so that the operator can observe the instrument directly from his working position. It is only necessary to effect a displacement of the zero position of the indicating member such that when the necessary speed is reached the pointer is opposite the setting mark. In corresponding manner any calculating device suitable for this purpose may be used for rotating the zero position of the indicating member or the setting mark.

Figure 15:
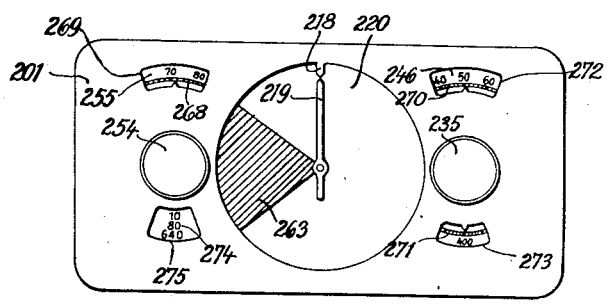
Figures 15, 16 and 17 are front elevations of various other forms of construction.

A variant form of construction is shown in external elevation in Figure 15. The internal arrangements of the apparatus according to Fig. 15 correspond substantially to the internal arrangements of the apparatus illustrated in Figs. 10 to 14. However, in the form of construction according to Fig. 15 the parallel shafts of the indicating discs 220, 246 and 265 are not arranged the one above the other but side by side. The spindle of the point 219 is again arranged coaxially with the shaft of the indicating disc 220. In the constructional form illustrated in Figure 15, there is provided on the indicating disc 265, instead of two cutting speed scales, only one cutting speed scale 266 which may be read in the window 269. The possibility of setting different speeds of revolution, as with the two scales 221 shown in Fig. 11 which are employed as described above according to whether a countershaft is connected or disconnected, is taken into account in the apparatus of Figure 15, by the employment of two diameter scales 270, 271, which are arranged on the indicating disc 246 and may be read in the two windows 272, 273. The radial distance of the diameter scale 270 or of the window 272 from the axis of the knob 235 is greater than the radial distance of the diameter scale 271 or of the window 273 from the said axis.

On the indicating disc 265 there are provided, in addition to the cutting speed scale 266, three diameter scales 274 which may be read in the window 275. The upper and central scales indicate the smallest and the greatest diameter of work which may be set at the cutting speed in question, when the machine tool is directly driven, i. e. when it is driven without a countershaft. The central and lower scales indicate the minimum and maximum diameters which may be set when the countershaft is engaged. The radial distance of the cutting speed scale 266 or of the window 269 from the axis of the knob 254 is greater than the radial distance of the diameter scales 274 or of the window 275 from the said axis.

Therefore, with the apparatus illustrated in Figure 15, after a cutting speed has been set in the window 275, it is possible at once to read in this window in which of the two diameter windows 272, 273 the setting of the diameter is to be effected and in what manner in the case in question the countershaft is to be engaged. The speeds which cannot be set are again indicated on the disc 220 by means of the hatched sector 269. The correct setting of the speed of revolution of the machine is then again effected when the pointer 219 of the speedometer is opposite the mark 218.

Figure 16:
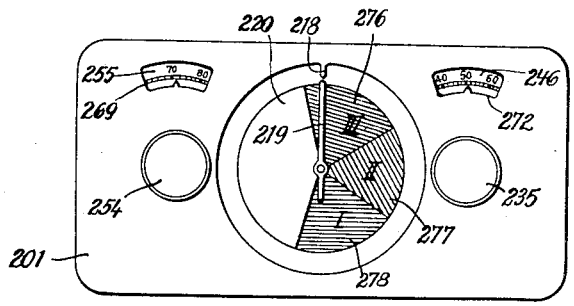

The construction illustrated in Figure 16 is similar as regards its external form to the apparatus illustrated in Figure 15 and corresponds as regards its internal arrangements substantially to the apparatus illustrated in Figures 10 to 14. The apparatus illustrated in Figure 16 is provided with a speedometer which has a large range of indication which may be read at a glance, so that it may be driven directly from the working spindle in the machine tool. It is thus not necessary to derive the drive of the speedometer from a shaft which drives the working spindle of the machine tool only through various countershafts. In the apparatus according to Figure 16 there are provided on the indicating disc 220 of the speedometer, instead of the speeds of revolution, only three hatched fields 276, 277 and 278. These fields denote the three ranges of speed of rotation which may be obtained in three different positions of a countershaft. When the cutting speed is set by means of the knob 254 and the diameter by means of the knob 235, the indicating disc 220 is set in the position corresponding to the necessary speed of revolution. The position in which the countershaft is to be engaged may then at once be read off. After the countershaft has been appropriately engaged the machine is brought to the correct speed of revolution. The correct speed is again reached when the pointer 219 is opposite the mark 218.

The manufacture of the apparatus illustrated in Figures 15 and 16 may be simplified and the accuracy of setting may be improved by using a speedometer having a logarithmic scale instead of a speedometer having a linear scale. In this case the cam drive which is illustrated in Figure 10 and comprises the cam 230, the roller 229 and the sector 228 may be omitted, and the casing 214 of the speedometer may be driven directly from the toothed wheel 233 by means of a toothed wheel drive. Instead of the above-mentioned toothed wheel drive, a cord drive or the like may also be used.

The constructional forms described above offer the important advantage that the supervision of the operation of the machine tool is simplified in that only the setting of the pointer 219 on the mark 218 need be observed. The same simplification of supervision of operation may also be effected by rotating the indicating mark 218 instead of by rotating the pointer 219 of the speedometer. The rotation of the mark 218 may be effected in a similar manner to the pointer 219 as previously described. It is also not necessary to effect the rotational displacement of the speedometer or of the setting mark or of another indicating member the position of which is dependent upon the speed of revolution of the machine shaft, through an epicyclic gear like the gear 238, 239, 240 illustrated in Figure 10. By another appropriate arrangement and construction of logarithmic graduations, or of any other calculating devices, it is possible to carry out the same supervision of the machine which is based upon the fact that, after setting all the factors determining the operation, the correct setting of the machine is effected by observing the setting of a pointer on a mark.

Figure 17:
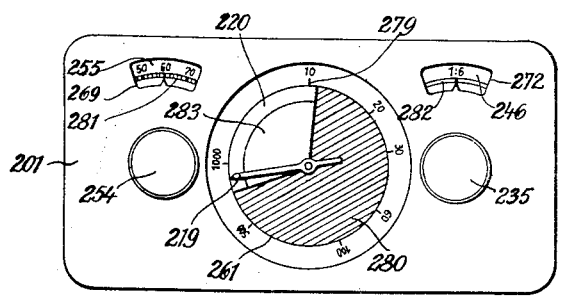

In Figure 17 is shown another form of an apparatus the construction of which is similar to that first mentioned and which corresponds in general to the apparatus illustrated in Figure 15 and Figure 16. The indicating disc 220 associated with the speedometer is again set in accordance with a logarithmic law through the agency of the epicyclic gear 238, 239, 240, 241, illustrated in Figure 10. It is again assumed that the speedometer is driven in this case not directly from the working spindle but from a shaft which drives the working spindle only through various gearing. In the construction according to Figure 17 a diameter scale 279 is provided on the cover 201 at the edge of the window 261 through which the indicating disc 220 is visible. The range of the speedometer which is not to be set is indicated by a hatched sector 280 on the disc 220. The speed of revolution at which the machine is driven is again indicated by the pointer 219. On the indicating disc 255 is again provided a scale 281 for the cutting speed. The indicating disc 246 has in this form of construction a scale 282 for a geared drive.

The setting of the disc 220 is effected upon the rotation of the knobs 235, 254, by means of the epicyclic gear 238, 239, 240, 241, illustrated in Figure 10. The position of the indicating disc 220 of the speedometer is thus dependent both upon the cutting speed which has been set and upon the gear train which has been engaged.

The method of operation of the device according to Figure 17 is as follows:

The desired cutting speed is first set by means of the knob 254. The adjustable range of diameter is then indicated by the non-hatched sector 283 of the disc 220 of the speedometer on the diameter scale 279. If the diameter to be machined does not lie in this range, the disc 246 for the gear drive is rotated until the diameter lies in the range which may be allowable. The transmission gear which is to be set in this case can be read in the window 272. After this setting the machine requires to be regulated only with regard to the last factor, namely to the diameter of the scale 279, that is to say the pointer 219 of the speedometer must indicate the diameter value which is to be taken into account in machining.

The construction of the apparatus according to the invention may also be such that the indicating member of a speedometer is in addition directly set. Such a construction of the apparatus which works in a similar manner to the apparatus first described and possesses a speedometer having a logarithmic characteristic is illustrated in Figs. 18 and 19. On the cover 284 of the casing 285 of the apparatus illustrated in Figures 18 and 19 is provided a logarithmic scale 286 for the diameter. In the casing 285 is arranged a speedometer 287 which in general is similar to the speedometer 203 shown in Figure 10. The casing 288 which corresponds to the casing 214 in Figure 10 is rotatable by means of a hollow pin 289 in a boss 290 of the casing 285. On the casing 288 is fixed a disc 291 which is provided on the inner part with logarithmic graduations 292 for the speed of revolution and on the outer part with logarithmic graduations 293 for the cutting speed. The cover 284 is provided with windows 294 through which the cutting speed scale may be read, the cutting speed scale for any of three transmission ratios being visible in each window 294. To the casing 288 is fixed a setting lever 295 which projects outwardly through a slot 296 in the casing 285. By means of the lever 295 the indicating disc 291 of the speedometer is set at the desired value.

A spindle 297 is revoluble in the casing 288 and coaxial therewith. This spindle carries a pointer 298 which corresponds to the pointer 219 of Figure 11. In the inside of the casing 288 there is also revoluble a box which corresponds to the box 211 in Figure 10 and is driven from the machine by means of a pulley 299. Upon the rotation of this box an angular movement is imparted to the pointer 298 as has been previously explained in connection with the pointer 219 of Figure 10. The spindle 297 is connected to the casing 288 by means of a spiral spring in exactly the same manner as the spindle 217 shown in Figure 10.

In the apparatus illustrated in Figures 18 and 19 the speedometer is not directly driven from the working spindle but is driven from a shaft which drives the working spindle through the intermediary of three gears. Accordingly three different values of cutting speed are indicated in the three windows 294.

The method of operation of the apparatus illustrated in Figures 18 and 19 is as follows:

In accordance with which of the gear trains is engaged a certain cutting speed in metres per minute is set in one of the windows 294 by rotating the casing 288 by means of the lever 295. The non-hatched part 300 of the part of the disc 291 which is visible in the window 301 of the cover 284 indicates the range of diameter which may be set with the gear train in question. If the diameters to be reduced lie within this range the correct operating speed is obtained when the pointer 298 of the speedometer indicates the diameter of the scale 286 which is to be produced. The three scales 292 provided on the disc 291 for the speed of revolution indicate the speeds which are set in the case of the various transmission gears.

The cutting speed is accordingly set in one of the windows 294 in such a manner that the diameter to be produced lies within the range which may be obtained. Furthermore the speed of revolution of the machine is so regulated that the pointer 298 indicates the diameter of the scale 286 which is to be produced. In this case only the cutting speed is used as the determining factor.

The special advantage of the apparatus illustrated in Figs. 17, 18, 19, is that the scale which comes especially into consideration, namely, in the form illustrated in Figs. 18 and 19 for instance, the diameter scale 286 upon which the pointer 298 is set is not rotated, so that it is very simple and easy to read off the value which is indicated by the pointer 298.

The pointer 298 of the speedometer according to Figs. 18 and 19 may coact with a setting mark, similar to the mark 218 of Figures 10 to 16, instead of with a scale 286.

The scale 293 (Fig. 18) may also be associated with one or more adjustable screens.

In apparatus of the first-mentioned form of construction, it is immaterial what factors are taken as the last and thus by what factors, after the setting of the other values, the regulation of the speeds is effected.

Another construction of the apparatus of the invention may, for example, be such that there is provided on an apparatus such as is illustrated in Figure 16 as well as a mark in the middle also a setting mark on the right hand and also on the left hand side. For drilling or boring machines this is especially advantageous for the following reasons.

After the setting of the characteristic cutting speed for the drilling or boring of the material in the window 269 and of the diameter of the hole in the window 272, the drilling or boring spindle has reached the correct speed for the operation in question when the pointer 219 indicates the left hand mark. The operation which usually follows and which has to be carried out at a lower cutting speed and a corresponding lower speed of revolution is countersinking. The speed of revolution necessary for this is reached when the pointer indicates the central mark. The speed of revolution for the final operation of reamering or thread cutting is reached when the pointer 219 indicates the right hand mark.

By means of a further window which corresponds to the window 273 in Figure 15 the feeds which correspond to the diameter of the drill for various materials may be given in this case. These feeds and the diameters of drill are recorded on the disc 246.

The above-mentioned form of construction represents a combination of the two above-mentioned forms of the invention, because the second method is used when only drilling is carried out, as the pointer is then always to be set at the left hand mark, while the first method is used when all three operations are to be carried out on the machine and accordingly three setting marks are used; in the latter case a certain setting of the indicating member for the speed at the last factor is effected.

If, in accordance with the invention, a setting mark, a pointer or the like is so displaced, in conformity with the setting of variable values which influence the speed, relatively to an indicating member, for example a pointer which depends for its position upon the operating speed, that the correct speed is denoted by co-ordination of the indicating member with the setting mark the speedometer is fixed in the casing of the indicating apparatus. In this case therefore no displacement of the zero position of the indicating member associated with the speedometer is necessary. The above-mentioned setting mark or the like is in this case arranged around the speedometer, and the position of the setting mark is adjustable by means of a calculating device which works in a similar manner to the above-described devices for displacing the zero position of the speed indicating member.

Figure 20:
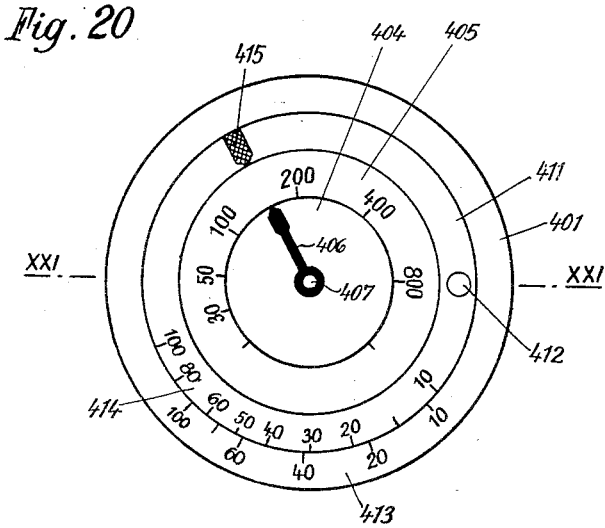
Figure 20 is a front elevation of a further simplified form of construction of an apparatus according to the invention.
Figure 21:
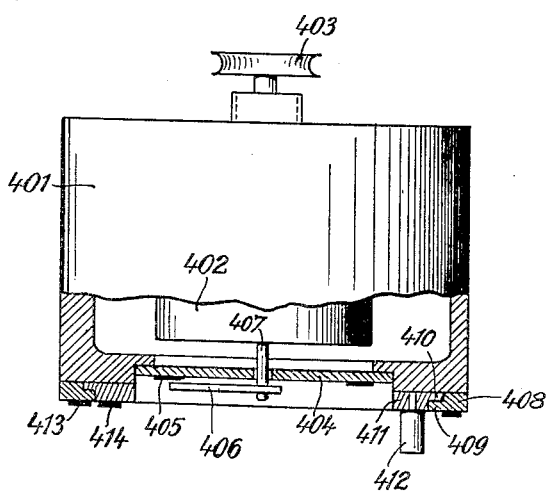
Figure 21 illustrates the apparatus shown in Fig. 20 partly in plan and partly in section on the line XXI—XXI of Fig. 20.

The apparatus illustrated in Figures 20 and 21 is provided with a casing 401 in which is incorporated the casing 402 of a speedometer. This speedometer corresponds in general to the speedometer 203 illustrated in Figure 10 and is operated by means of the pulley 403. On the front side of the casing 401 is fixed a plate 404 on which is provided a logarithmic speed scale 405. With this speed scale a pointer 406, which is fixed to the shaft 407 of the speedometer, coacts. The shaft 407 and thus the pointer 406 makes a less or greater angular deflection in accordance with the speed of revolution of the pulley 403, as has been explained above in connection with the apparatus illustrated in Figures 10 to 13. The momentary speed of revolution of the machine is always indicated by the pointer 406 on the scale 405.

On the front side of the casing 401 there is also fixed a ring 408 of which the projection 409 engages over a projection 410 of a ring 411 which is rotatable on the front side of the casing 401. On the ring 411 is fixed a pin 412 by means of which the ring 411 may be displaced by hand. The stationary ring 408 is provided with a logarithmic cutting speed scale 413 while on the revoluble ring 411 is provided a logarithmic diameter scale 414. The ring 411 is also provided with a setting mark, for example with an arrow 415, which always indicates that speed of revolution on the speed scale 405 which corresponds to the diameter and speed values which are opposite one another.

The same logarithmic scale is used for the graduations 405 for the speed of revolution, for the graduations 413 for the cutting speed and for the graduations 414 for the diameter.

The method of operation of the apparatus according to Figures 20 and 21 is as follows:

When a certain diameter, for example 50 mm., is to be machined at a certain cutting speed, for example 40 meters per minute, the ring 411 is rotated by means of the pin 412 so that the graduation 50 of the diameter scale 414 is opposite the graduation 40 of the cutting speed scale 413. The arrow 415 then indicates on the cutting speed scale 405 that speed of revolution at which the machine must work in order to keep to the correct cutting speed. The correct speed of revolution is in this case set in a simple manner so that the pointer 406 indicates the arrow 415. The correct setting of the machine is thus obtained in the described apparatus by the coaction of a pointer 406 which is dependent upon the speed of revolution of the machine and a mark 415 which is set by hand.

Instead of the pointer 406 (Fig. 20) a black disc may also be fixed on the shaft 407 on which disc a white radial pointer is painted.

We claim:

1. Apparatus for determining the selected characteristic of the operation of a machine, said apparatus comprising a member adjustable to different positions in accordance with the magnitude of one characteristic of the operation of the machine; a member movable to different positions to indicate different magnitudes of another characteristic of the operation; an additional member adjustable in accordance with the magnitude of an additional characteristic of the operation of the machine; mechanism connecting said members whereby if any two members are set in accordance with the corresponding magnitudes the third member will be set in accordance with its corresponding magnitude; means for adjusting the position of the first of said members; and means operatively connected with the machine and automatically adjusted by the operation of the machine in effecting the said additional characteristic and connected with the said additional member to adjust the latter.

2. Apparatus for determining the selected characteristic of the operation of a machine, said apparatus comprising a member adjustable to different positions in accordance with the magnitude of one characteristic of the operation of the machine; a member movable to different positions to indicate different magnitudes of another characteristic of the operation: an additional member adjustable in accordance with the magnitude of an additional characteristic of the operation of the machine; mechanism connecting said members whereby if any two members are set in accordance with the corresponding magnitudes the mechanism will set the third member in accordance with the corresponding magnitude of the third member; means operated by the machine effecting the change in said magnitude corresponding to the first of said members for adjusting the position of such member; and means operatively connected with the machine and automatically adjusted by the operation of the machine in effecting the said additional characteristic and connected with the said additional member to adjust the latter.

3. Apparatus for facilitating the determination of the desired relation of the speed of rotation of a lathe, the cutting speed and work diameter, said apparatus comprising a rotary work-diameter member; a rotary rotation-speed member; a cutting-speed member; a differential mechanism operative by any one of the members and operatively connected to the other members for rotating any member when another is rotated while the third is held stationary; and logarithmic scales arranged around the axes of the members and so related to the differential ratios as to indicate work-diameter, cutting speed and rotation-speed corresponding to the relative positions of the members; the rotation-speed member having associated therewith associate means for facilitating the coordination of different rotation-speeds of the lathe with corresponding positions of the rotation-speed member.

4. Apparatus as in claim 3 said associate means comprising symbols mounted on the rotation-speed member and indicating by their appearance and position on the member operating directions corresponding to different rotation-speeds and corresponding positions of the rotation-speed.

5. Apparatus as in claim 3 said associate means comprising means operated by the speed control means of the lathe to position the rotation-speed member in accordance with the speed.

6. Apparatus as in claim 3 comprising means operated by the tool holder for positioning the work-diameter member in accordance with the radial displacement of the tool holder.

7. Apparatus as in claim 3 said associate means comprising a plurality of rotary gear members adapted to be geared to respective speed control levers of a lathe whereby each gear member is moved an increment by operation of the corresponding speed control lever and differential means operated by the gear members for transmitting the product of said increments to the rotation speed member to position the latter; and means for positioning the work-diameter member in accordance with the work diameter, whereby said differential mechanism adjusts the cutting speed member in accordance with the positions of the work diameter member and the rotation speed member.

8. Apparatus as in claim 3 said associate means comprising a plurality of rotary gear members adapted to be geared to respective speed control levers of a lathe whereby each gear member is moved an increment by operation of the corresponding speed control lever, and differential means operated by the gear members for transmitting the product of said increments to the rotation speed member to position the latter; and means operatively connecting the tool holder of the lathe with the work diameter member for positioning the work-diameter member in accordance with the radial displacement of the tool holder, whereby said differential mechanism adjusts the cutting speed member in accordance with the positions of the work diameter member and the rotation speed member.

9. Apparatus for determining the speed of a lathe, said apparatus comprising a work-diameter member adjustable in accordance with the radial displacement of the cutting tool; a cutting-speed member movable to positions to indicate cutting speeds; a rotation speed member adjustable in accordance with the rotation speed; mechanism connecting said members and adapted when any two members are set in accordance with their corresponding factors, to set the third member in accordance with its factor; and associate means operatively connected with the lathe and automatically adjusted by the operation of the lathe in adjusting its rotation speed, and connected with the rotation-speed member to adjust the latter in accordance with the rotation speed.

10. Apparatus in accordance with claim 9 comprising means operated by the radial displacement of the tool holder for adjusting the work-diameter member in accordance with said displacement.

11. Apparatus for facilitating the determination of the desired relation of the speed of rotation of a lathe, the cutting speed and work diameter, said apparatus comprising a rotary work-diameter member; a cutting-speed member; separate means for adjustably rotating said members; a rotary rotation-speed member; brake means for yieldably holding the work-diameter and cutting-speed members against rotation; a differential operative by the cutting-speed member and operatively connected to the other members for rotating the rotation-speed member when either of the other members is rotatably adjusted while the third is held stationary by the brake; and logarithmic scales arranged around the axes of the members and so related to the differential ratios as to indicate work-diameter, cutting speed and rotation-speed corresponding to the relative positions of the members; the rotation-speed member having mounted thereon symbols indicating by their positions operating directions corresponding to different rotation speeds and corresponding positions of the rotation-speed member for facilitating the coordination of different rotation-speeds of the lathe with corresponding positions of the rotation-speed member.

12. Apparatus comprising a rotary shaft; a drum loose on the shaft; separate means for adjustably rotating the drum and shaft; another drum loose on the shaft; an intermediate drum fast on the shaft between the other drums; brake means for yieldably holding the drum against rotation the first named drum and the intermediate drum only; a differential carried by the intermediate drum and operatively connected to the other drums for rotating the rotation-speed drum when either of the other drums is adjusted while the third is held stationary by the brake; and logarithmic scales on the drums so related to the differential ratios as to indicate relative values corresponding to the relative positions of the drums.

13. Apparatus for determining the speed of a lathe when the cutting speed and work diameter are known, said apparatus comprising a rotary shaft; a work-diameter drum loose on the shaft; separate means for adjustably rotating the drum and shaft; rotation-speed drum loose on the shaft; a cutting-speed drum fast on the shaft between the other drums; a differential carried by the cutting-speed drum and operatively connected to the other drums for rotating the rotation-speed drum when either of the other drums is adjusted while the third is held stationary; and logarithmic scales on the drums so related to the differential ratios as to indicate work-diameter, cutting speed and rotation-speed corresponding to the relative positions of the drums.

14. Apparatus as in claim 13, the rotation speed drum having thereon symbols indicating operating directions corresponding to different rotation-speeds and corresponding rotation-speed drum positions.

15. Apparatus as in claim 13 including brake means for yieldably holding the work-diameter and cutting-speed against rotation.

16. Apparatus for determining the speed of a lathe when the cutting speed and work diameter are known, said apparatus comprising a housing having windows; a rotary shaft; a work-diameter drum loose on the shaft; separate means for adjustably rotating the drum and shaft; rotation-speed drum loose on the shaft; a cutting-speed drum fast on the shaft between the other drums; brake means for yieldably holding the work-diameter and cutting-speed against rotation; a differential carried by the cutting-speed drum and operatively connected to the other drums for rotating the rotation-speed drum when either of the other drums is adjusted while the third is held stationary by the brake; and logarithmic scales on the drums and visible at certain of the windows and so related to the differential ratios and the windows as to indicate work-diameter, cutting speed and rotation-speed corresponding to the relative positions of the drums; the rotation speed drum having thereon symbols visible at the windows to indicate operating directions corresponding to different rotation-speeds and corresponding rotation-speed drum positions.

17. Apparatus for facilitating the determination of the desired relation of the speed of rotation of a machine tool, the cutting speed and work diameter, said apparatus comprising a casing having front and back walls one wall having windows; three parallel shafts having their ends rotatively mounted in said walls; rotary work-diameter and cutting-speed members fast on two of the shafts; knurled heads on said two shafts for rotatively adjusting the members; a rotation-speed member on the third shaft; brake means for yieldably holding the work-diameter and cutting-speed members against rotation; a differential carried on the third shaft and operatively connected to the members for rotating the rotation-speed member when either of the work-diameter or cutting-speed members is adjusted by the knurled head while the third member is held stationary by the brake; said members being in the form of disks having logarithmic scales arranged around the axes of the members and visible at said windows and so related to the windows and differential ratios as to indicate work-diameter, cutting speed and rotation-speed corresponding to the relative positions of the members; the rotation-speed member having symbols thereon and visible at some of the windows to indicate operating directions corresponding to different rotation speeds for facilitating the coordination of different rotation-speeds of the machine tool with corresponding positions of the rotation-speed member.

18. Apparatus for facilitating adjusting the speed of rotation of a lathe having speed control levers and a displaceable tool holder said apparatus comprising a settable work diameter member having means associated therewith to facilitate its setting in accordance with the displacement of the tool-holder; a settable rotation speed member having means associated therewith to facilitate the setting of the rotation speed member in accordance with control levers and therefore the transmission ratio of the lathe gear; a settable cutting speed member; and means operatively connected with and operated by the work diameter member and rotation speed member of setting the cutting speed member in accordance with the setting of the other members.

19. Apparatus for facilitating adjusting the speed of rotation of a lathe having speed control levers and a tool holder said apparatus comprising a settable work diameter member having means associated therewith to facilitate its setting in accordance with the radial displacement of the tool-holder; a settable rotation speed member having means associated therewith to facilitate the setting of the rotation speed member in accordance with control levers and therefore the transmission ratio of the lathe gear; a settable cutting speed member; and differential means operatively connected with and operated by any two of the members setting the third member in accordance with the setting of the first two members.

20. Apparatus as in claim 19 in which said means associated with the work diameter member comprises an operative connection between the tool holder and the work diameter member.

21. Apparatus as in claim 19 in which said means associated with the rotation speed member comprises differential means operatively connected to the levers and the rotation speed member.

22. Apparatus as in claim 19 in which the means associated with the rotation speed member comprises symbols on such member corresponding to the respective levers.

23. Apparatus for facilitating adjusting the speed of rotation of a lathe having a tool holder and three gear-ratio-changing speed control levers adapted to be set one, two or three at a time, said apparatus comprising a settable work diameter member having means associated therewith to facilitate its setting in accordance with the radial displacement of the tool-holder; a settable rotation speed member having symbols corresponding to the levers; a casing having windows with which the respective symbols may register one or more at a time to facilitate the setting of the rotation speed member in accordance with the setting of the control levers and vice versa, and therefore the transmission ratio of the lathe gear; a settable cutting speed member; and differential means operatively connected to the three members for setting any member in accordance with the setting of the other two members; said windows and symbols being so arranged that when the cutting speed member is set to correspond to the cutting speed, and the work diameter member is set to correspond to the cutting diameter, the rotation speed member will be set to expose the one, two or three symbols corresponding to the setting of the levers required to be set to give the rotation speed, thereby to facilitate adjusting the speed of the lathe.

24. Apparatus for facilitating adjusting the speed of rotation of a lathe having a tool holder and speed control levers adapted to be set one, two or three at a time, said apparatus comprising a settable work diameter member having means associated therewith to facilitate its setting in accordance with the radial displacement of the tool-holder; a settable rotation speed member having symbols corresponding to the levers; a casing having windows with which the respective symbols may register one, two or three at a time to facilitate the setting of the rotation speed member in accordance with the setting of the control levers and vice versa, and therefore the transmission ratio of the lathe gear; a settable cutting speed member; and differential means operatively connected to the three members for setting any member in accordance with the setting of the other two members; said windows and symbols being so arranged that when the work diameter member is set to correspond to the cutting diameter, and the rotation speed member is set to expose the one or more symbols corresponding to the setting of the levers required to be set to give the rotation speed, the cutting speed member will be set to correspond to the cutting speed.

25. Apparatus for facilitating adjusting the speed of rotation of a lathe having a tool holder and speed control levers adapted to be set one or more at a time to give a predetermined gear ratios, said apparatus comprising a settable rotation speed member having symbols corresponding to the lever; a casing having windows with which the respective symbols may register one or more at a time to facilitate the setting of the rotation speed member in accordance with the setting of the control levers and vice versa; a settable cutting speed member; and means operatively connected to the members for setting either member in accordance with the setting of the other member; said windows and symbols being so arranged that when the cutting speed member is set to correspond to the cutting speed, the rotation speed member will be set to expose the one or more three levers required to be set to give the rotation speed, and vice versa.

26. In combination a lathe having a radially displaceable tool holder; a cutting speed member; and means operatively connected to, and operated by said tool holder for automatically adjusting the cutting speed member in accordance with the position of said tool holder.

27. In combination a machine having speed control levers settable one or more at a time; a speed member; and differential means operatively connected to, and operated by said levers for automatically adjusting the speed member in accordance with the setting of one or more of said levers.

28. In combination a lathe having speed control levers and a radially displaceable tool holder; a cutting speed member; and differential means operatively connected to, and operated by said levers and tool holder for automatically adjusting the cutting speed member when said levers and tool holder are operated.

29. In combination a lathe having a radially displaceable tool holder and three speed control levers settable one, two or three at a time; a cutting speed member; and differential means operatively connected to, and operated by said levers and tool holder for automatically adjusting the cutting speed member in accordance with the position of said levers and tool holder.

30. In combination, a lathe having transmission ratio speed control levers and a radially displaceable tool holder; a rotation-speed member; differential means operated by said levers for transmitting the product of their movements to the rotation speed member; a cutting speed member; and a differential mechanism operated by the displacement of the tool holder and the operation of said rotation speed member for adjusting the cutting speed members; whereby setting of the tool holder and the transmission ratio of the lathe automatically adjusts the position of the cutting speed member, thereby to facilitate adjusting the speed of the lathe.

31. In combination, a lathe having speed control levers, and a radially displaceable tool holder; a rotary work-diameter member; a rotary rotation-speed member; a rotary cutting-speed member; a differential mechanism operative by any one of the members and operatively connected to the other members for rotating any member when another is rotated while the third is held stationary; scales so arranged around the axes of the members to indicate work-diameter, cutting speed and rotation-speed corresponding to the positions of the members; rotary gear members geared to the respective speed control levers and moved an increment by setting of the corresponding lever; and differential means operated by the gear members for transmitting the product of said increments to the rotation speed member to position the latter.

32. In combination, a lathe having speed control levers, and a radially displaceable tool holder; a rotary work-diameter member; a rotary rotation-speed member; a rotary cutting-speed member; a differential mechanism operative by any one of the members and operatively connected to the other members for rotating any member when another is rotated while the third is held stationary; scales so arranged around the axes of the members respectively to indicate work-diameter, cutting speed and lever positions corresponding to the positions of the members; and means operatively connecting the tool holder to the work diameter member for positioning the latter in accordance with radial displacement of the tool holder.

33. In combination, a lathe having two or more speed control levers, and a radially displaceable tool holder; a rotary work-diameter member; a rotary rotation-speed member; a rotary cutting-speed member; a differential mechanism operative by any one of the members and operatively connected to the other members for rotating any member when another is rotated while the third is held stationary; scales so arranged around the axes of the members to indicate work-diameter, cutting speed and rotation-speed corresponding to the positions of the members; rotary gear members geared to the respective speed control levers and moved an increment by setting of the corresponding lever; differential means operated by the gear members for transmitting the product of said increments to the rotation speed member to position the latter; and means operatively connecting the tool holder to the work diameter member for positioning the latter in accordance with radial displacement of the tool holder.

34. Apparatus for facilitating adjusting the speed of a machine having speed control levers adapted to be set one or more at a time, said apparatus comprising a settable rotation speed member having a scale arranged therearound to indicate the machine rotation speeds; and means in part carried by the member to facilitate the setting of the rotation speed member in accordance with the setting of the control levers and vice versa and therefore the transmission ratio of the machine.

HERMANN RÜHL.
RUTHARD GERMAR.